L. D. LOVEKIN.
WATER HEATER.
APPLICATION FILED MAR. 10, 1915.
1,166,531.
Patented Jan. 4, 1916.
2 SHEETS—SHEET 1.
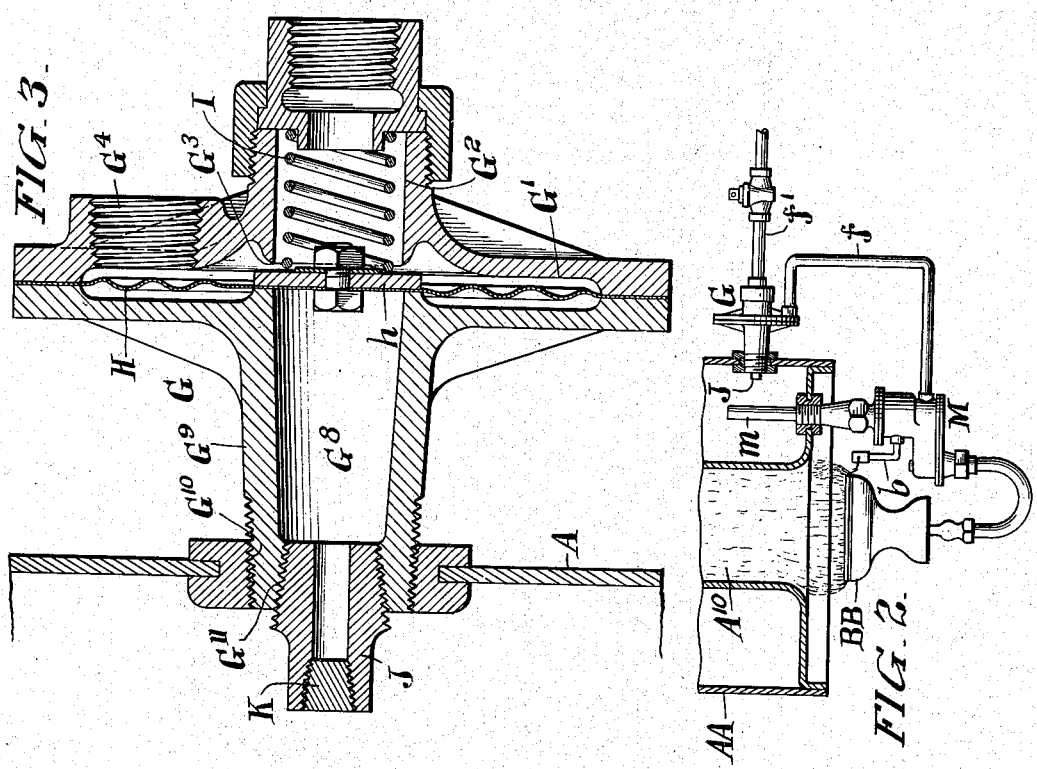
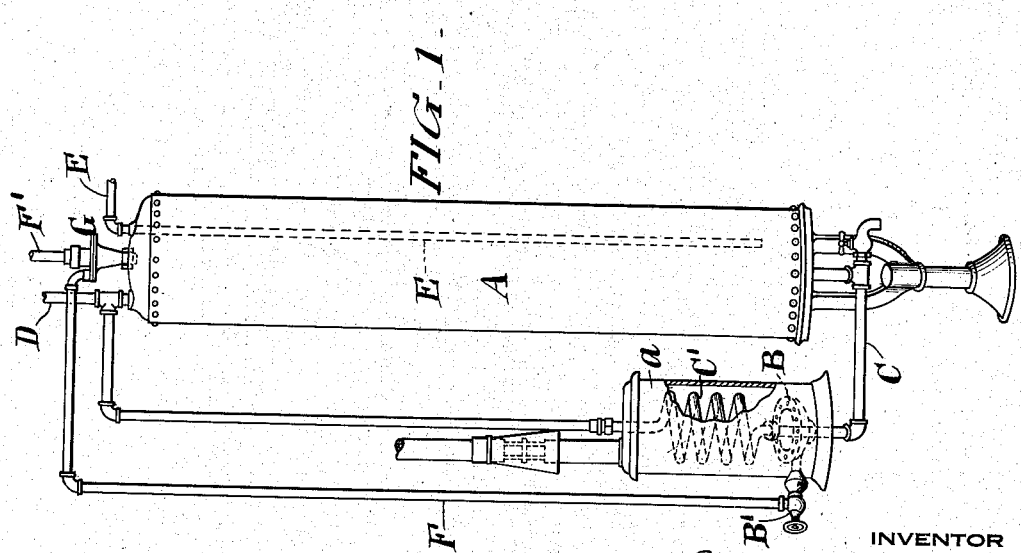
WITNESSES
INVENTOR
BY
ATTORNEY L. D. LOVEKIN.
WATER HEATER.
APPLICATION FILED MAR. 10, 1915.
1,166,531.
Patented Jan. 4, 1916.
2 SHEETS—SHEET 2.
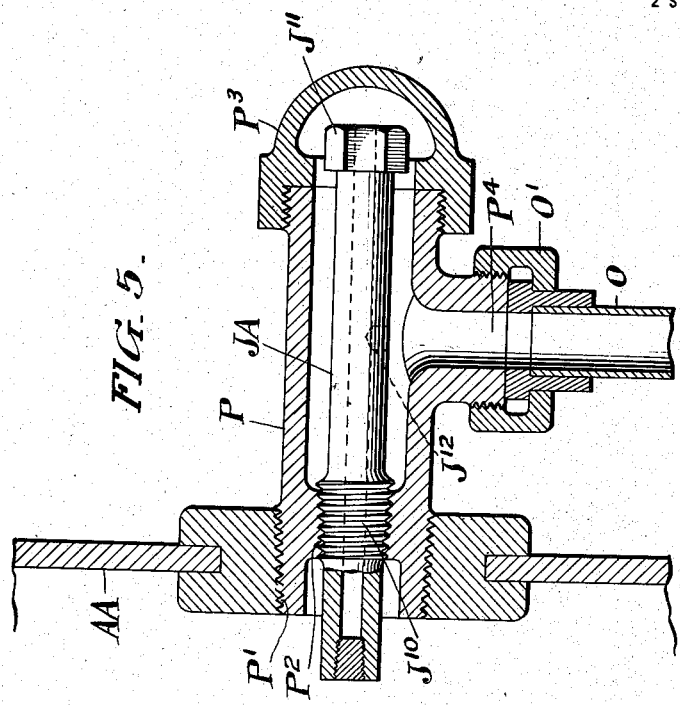
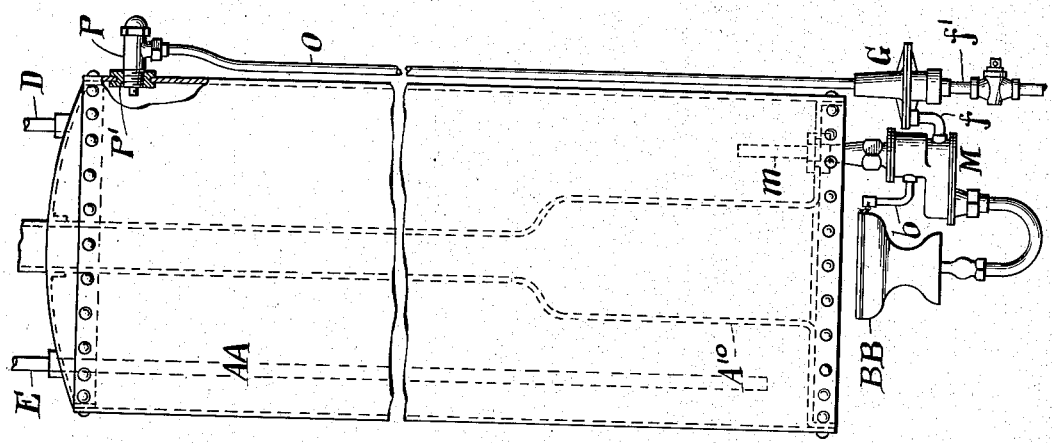
WITNESSES
INVENTOR
BY
ATTORNEY

UNITED STATES PATENT OFFICE.

LUTHER D. LOVEKIN, OF PHILADELPHIA, PENNSYLVANIA.

WATER-HEATER.

1,166,531.  Specification of Letters Patent.  Patented Jan. 4, 1916.

Application filed March 10, 1915. Serial No. 13,336.

*To all whom it may concern:*

Be it known that I, LUTHER D. LOVEKIN, a citizen of the United States of America, residing in the city and county of Philadelphia, State of Pennsylvania, have invented a certain new and useful Improvement in Water-Heaters, of which the following is a true and exact description, reference being had to the accompanying drawings, which form a part thereof.

My present invention relates to the kind of water heater in which water is heated by the combustion of fluid fuel, and the heated water is heated in, or passed into a chamber normally filled with water under a substantial pressure regardless of the temperature of the water.

My invention is particularly intended for use in connection with domestic water heaters which are connected to the usual city mains or other systems supplying water under pressure, and which are heated by gas burners.

The object of my invention is to provide means which are both certain in operation and relatively inexpensive to construct, install, and maintain for shutting off the supply of fluid fuel to the burner of a water heater of the kind referred to above, whenever the temperature of the water in the storage tank or other hot water container of the heater rises to a predetermined maximum temperature. My improvement is intended for use with heaters in which the supply of fuel is normally controlled by thermostatic means responsive to the temperature of the water heated, as well as with heaters in which the fuel supply is wholly under manual control under normal conditions. In the last case, my improvement protects against the injurious consequences heretofore resulting from a failure of the attendant to turn off the supply of fuel when the need for its further operation ceases, and in the other case, from a failure of the thermostatic mechanism to interrupt the supply of gas at the proper time, due either to faulty adjustment of, or to defects in the thermostatic mechanism.

The continued operation of the fuel burner of a water heater for an indefinite period in which no hot water is being utilized, not only involves a waste of fuel, but is a source of danger and of serious property damage. The consequent overheating of the water heater inevitably weakens the latter, and not infrequently causes the "boiler" or other hot water containing chamber of the heater to burst, and the excessive temperatures and pressures engendered are also apt to injure the connected piping and fittings.

To accomplish the object of my invention I provide a fluid pressure operated cut off valve in the gas supply line, and connect the motor chamber of this valve to the water space of the heater by a passage normally closed by a plug of suitable fusible material. The latter is adapted to fuse, and permit the transmission of the pressure of the water space of the heater to the pressure chamber of the valve in order to close the latter, whenever the temperature of the water in the water space rises to the predetermined temperature at which the fusible plug gives way.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described preferred forms of my invention.

Of the drawings: Figure 1 is a somewhat diagrammatic elevation of one common type of domestic water heater in which my invention is employed; Fig. 2 is a partial sectional elevation of another form of water heater in which my invention is employed; Fig. 3 is a sectional elevation on a larger scale than Figs. 1 and 2, of the cut off valve employed; Fig. 4 is a view generally similar to Fig. 1 illustrating a slightly modified arrangement; and Fig. 5 is a sectional elevation of the fusible plug holder, and the fitting in which it is mounted, employed in Fig. 4.

In Fig. 1 of the drawings I have illustrated the application of my invention to a domestic water heater of common type in which there is a storage tank A, and a circulating pipe C connected to tank A at top and bottom and comprising a coil portion C' located in the casing of a separate gas heater proper, of which B is the gas burner. D represents the outlet pipe for hot water, and E the cold water supply pipe connecting the tank A to the city water mains or other supply source. F and F' represent sections of the gas supply pipe for the burner B. The supply of gas to the burner B is normally controlled by direct manipulation of the hand lever B'. The pipes F and F' are connected to the outlet and inlet, respectively, of the fluid pressure cut off valve G shown in detail in Fig. 3. As shown, the casing of the valve G comprises a body portion G⁹ externally threaded at G¹⁰ to permit it to be screwed into the wall of the heater storage tank, and internally threaded at G¹¹ to receive the bushing J. The axial passage through the latter is normally closed by a plug K, of suitable fusible material. At its outer end the casing portion G⁹ is provided with a flange portion, which in conjunction with the flange portion of a cap member G', forms a chamber for the flexible diaphragm H of copper, leather or the like, clamped at its periphery between the cap G' and casing section G⁹. The cap G' is provided with a central hollow boss G² to which the gas supply pipe section F' is connected. At the inner end of the boss G², a valve seat G³ is formed. Adapted to engage the seat G³ and close the passage through the boss G² when the fusible plug K yields, is a valve which might be simply the central portion of the diaphragm H, but advantageously, as shown, is a disk $h$ of leather, soft metal or other suitable valve forming material secured to the center of the diaphragm H. The cap member G' is also formed with a threaded aperture G⁴ at the side of the central boss G² through which the gas supply pipe section F is secured to the casing of the valve G.

Normally the valve $h$ is in its wide open position, and the helical spring I, is employed to insure this. Free communication is thus normally maintained between the pipe sections F' and F. When the temperature of the water in the tank A rises to the predetermined maximum, fixed by the composition of the fusible plug K, the latter softens and gives way under the pressure in the tank. The water then passes through the central passage of the bushing J into the adjacent chamber G⁸ of the valve G and acting against the flexible diaphragm H, forces the valve $h$ tightly against its seat, thus interrupting the passage of gas from pipe section F' to the pipe section F and thence to the burner B. The pressure of the water acting on the one side of the diaphragm is much greater, of course, than the pressure of the gas on the other side and should also greatly exceed the thrust of the spring I, so that the valve will be held closed by a substantial force. This force is unaffected, of course, by the temperature of the water and does not diminish when the water cools off.

To permit a renewal of the flow of gas it is necessary, with the apparatus shown in Figs. 1, 2 and 3, to disconnect the casing of valve G from the tank, and put a new plug K in place. In practice, when the valve G is detached from the tank, the previously used bushing or plug holder J is ordinarily replaced by a similar bushing having a fusible plug K operatively mounted therein.

It will be apparent to those skilled in the art that the valve mechanism shown in Fig. 3 is very simple in construction and reliable in operation, and in particular that it is well adapted to resist deterioration with age and is not apt to become inoperative through a long period of non-use. The wall of the diaphragm chamber may well be, and is shown as being, so shaped and disposed with reference to the diaphragm that the latter will be effectually supported by the wall against injurious distortion when the water pressure is admitted to act against the diaphragm. Inasmuch as the valve $h$ seats snugly against the valve seat G³ it prevents the passage of water into the gas supply mains through the pipe section F' in case the diaphragm H leaks. The possibility of a leaky diaphragm is of course, small, and with the construction shown, where the water passing through the leaky diaphragm would escape at the gas burner ordinarily on to a kitchen or basement floor, such leakage, if it did occur, would in most cases do but very little damage.

In Fig. 2 I have illustrated the use of my invention in connection with a water heater of the type in which a combustion chamber A¹⁰ is centrally disposed within a storage tank AA, and the supply of gas to the burner BB is normally controlled by the thermostatic valve M having a portion $m$ of its thermostatic mechanism extending into the water space of the storage tank AA. In this use of the apparatus, the valve will ordinarily be set to close off the supply of fuel when the water in the tank AA rises to some predetermined temperature, which seldom is as high as 200° Fah. and ordinarily is about 170° Fah. Under these conditions the fusible plug K in the valve G which controls the supply of gas through the pipe sections $f'$ and $f$ to the inlet of the thermostatic valve mechanism M, will ordinarily be of such a character that the plug will yield at a temperature of say 250° Fah. The plug K may be formed out of various materials. In practice I ordinarily employ a lead, tin, bismuth alloy having its different constituents proportioned, as those skilled in the art will understand, to insure its yielding at the desired maximum temperature.

In Fig. 2 I have shown the valve G as connected into the lower portion of the tank AA. This simplifies and shortens the gas pipe connection somewhat in many cases. There is this advantage, however, in placing the valve G at the top of the storage tank as shown in Fig. 1, rather than at the bottom, as shown in Fig. 2, that when placed at the top, it is not necessary to empty the tank preparatory to the removal of the valve G for the insertion of a new fusible plug K. In so far as the general operation of my invention is concerned, however, it is immaterial whether the fusible plug K is located at the top or the bottom of the storage tank, since in this type of a heater, when constructed with the proper circulating provisions, there is no great difference in temperature between different portions of the storage space.

In the arrangement shown in Figs. 4 and 5, the fluid pressure cut off valve G is located adjacent the burner level and is connected to the storage tank AA not directly, but through the pipe O and fitting P. The fusible plug K and its holder JA in this arrangement, are mounted in the fitting P which is externally threaded at P' into the tank AA. The fitting P' is internally threaded at P² to receive the threaded intermediate portion J¹⁰ of the plug holder JA. The outer end of the latter is shown as provided with a head J¹¹ so extended that when the cap P² closing the otherwise open outer end of the fitting P is removed the head J¹¹ may be readily engaged by an ordinary wrench. The holder JA is shown as hollow from end to end, and also as provided with a lateral port J¹². The pipe O which is in communication with the space in the fitting P surrounding the outer end of the holder JA, is shown as connected to the threaded lateral boss P⁴ of the fitting by an ordinary union coupling O'.

The arrangement shown in Figs. 4 and 5 obviously permits the valve G and fusible plug K each to be located in its most convenient position. Furthermore with this construction, the fusible plug holder can be removed and replaced without disturbing any piping, nothing more being involved than the removal of the cap P³, the unscrewing of the plug holder JA in use, the screwing of a new holder JA into place, and the replacement of the cap P³. Advantageously as shown, the seat for the plug K in the holder JA as in the holder J is tapered and threaded as shown.

It will be apparent to those skilled in the art that my improvement provides a very effective protection against the dangers of overheating, and that it is practically fool proof in that it is not susceptible of adjustment or manipulation, affecting its operation, and particularly the temperature at which it operates, by the ordinary unskilled users of water heaters of this kind.

I am aware of the general prior knowledge and use of fusible safety devices, and in particular, of the proposals heretofore made to locate a fusible plug or part in a steam generating boiler so as to be submerged with normal water levels therein and to be exposed and heated to a higher temperature than the water in the boiler and thereby caused to yield on a fall in water level to a predetermined minimum, and the provision in conjunction with a fusible part thus located, of means actuated by the boiler pressure to cut off the supply of fluid fuel by which the boiler is heated when the fusible plug or part softens and yields. I believe that I am the first, however, to provide a fluid fuel heated water heater of the general type specified, with a fuel controlling fuel pressure valve adapted to be closed and held closed by the water pressure in the water space of the heater whenever the temperature of the water in that space rises to a predetermined value at which the fusible plug employed yields, and thereby permits water to pass from said storage space into the pressure chamber of the cut off valve.

While in accordance with the provisions of the statutes, I have illustrated and described the best forms of my invention now known to me, it will be apparent to those skilled in the art that changes may be made in the forms of apparatus desclosed without departing from the spirit of my invention, and that under some conditions certain features of my invention may be used without a corresponding use of other features.

Having now described my invention what I claim as new and desire to secure by Letters Patent, is:

1. In a water heater of the kind comprising a water space containing the heated water and normally filled with water under pressure, means for heating the water contained in said space by the combustion of fluid fuel, a normally open fluid pressure motor valve adapted when closed to interrupt the fuel supply to said heater and comprising a motor chamber, the latter being connected to said space by a passage, and a fusible obstruction normally closing said passage and subjected to the temperature of the water in said space and adapted to yield and permit the passage of water from said space into the said motor chamber of said valve, whereby the latter is closed, on a predetermined rise of temperature of the water in said storage space.

2. In a water heater of the kind comprising a water storage space containing the heated water and normally filled with water under pressure, means for heating the water contained in said space by the combustion of fluid fuel, a normally open fluid pressure motor valve adapted when closed to interrupt the fuel supply to said heater and comprising a motor chamber, the latter being connected by a passage to said storage space at the upper end of the latter, and a fusible obstruction normally closing said passage and subjected to the temperature of the water in said space and adapted to yield and permit the passage of water from said space into the said motor chamber of said valve, whereby the latter is closed, on a predetermined rise of temperature of the water in said storage space.

3. In a water heater of the kind comprising a water space containing the heated water and normally filled with water under pressure, and a fluid burner for heating the water, and in combination therewith, means controlling the supply of fuel to said burner comprising a thermostatic valve mechanism normally regulating the supply of fuel to the burner and normally adapted to interrupt the fuel supply when the water in said space reaches a predetermined temperature, and a normally open fluid pressure motor valve adapted, when closed, to interrupt the fuel supply to said motor and comprising a motor chamber, the latter being connected to said water space by a passage, and a fusible obstruction normally closing said passage and subjected to the temperature of the water in said space and adapted to yield and permit the passage of water from said space into the said motor chamber of said valve, whereby the latter is closed, when the water in said water space rises to a predetermined temperature higher than the first mentioned temperature.

4. In a water heater of the kind comprising a water space containing the heated water and normally filled with water under pressure and a gas burner for heating the water contained in said space, and in combination therewith, means for controlling the fuel supply to said burner comprising a fluid pressure motor valve formed with a diaphragm chamber, a diaphragm mounted in said valve and dividing said chamber into a gas compartment and a water compartment, a normally open gas inlet to said compartment, a gas supply pipe connected thereto, a connection leading from said gas compartment to the burner, said water compartment being connected to said water space by a passage, and a fusible obstruction normally closing said passage and subjected to the temperature of the water in said space but adapted to yield and permit the passage of water from said space into said water compartment to thereby cause said diaphragm to seal said gas inlet on a predetermined rise of temperature of the water in said water space.

LUTHER D. LOVEKIN.

Witnesses:
 ARNOLD KATZ,
 D. STEWART.